US012099351B2

United States Patent
Huang et al.

(10) Patent No.: US 12,099,351 B2
(45) Date of Patent: *Sep. 24, 2024

(54) OPERATIONAL TESTING OF AUTONOMOUS VEHICLES

(71) Applicant: TUSIMPLE, INC., San Diego, CA (US)

(72) Inventors: Zehua Huang, La Jolla, CA (US); Yixin Yang, La Jolla, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/350,691

(22) Filed: Jul. 11, 2023

(65) Prior Publication Data

US 2023/0350399 A1 Nov. 2, 2023

Related U.S. Application Data

(63) Continuation of application No. 17/515,366, filed on Oct. 29, 2021, now Pat. No. 11,740,620, which is a (Continued)

(51) Int. Cl.
*G05D 1/00* (2024.01)
*G05B 23/02* (2006.01)

(52) U.S. Cl.
CPC ....... *G05B 23/0254* (2013.01); *G05D 1/0088* (2013.01)

(58) Field of Classification Search
CPC .............. G05B 23/0254; G05B 19/042; G05B 2219/2637; G05B 23/0243;
(Continued)

(56) References Cited

U.S. PATENT DOCUMENTS 10,124,907 B1 11/2018 Gavrilets et al.
10,747,223 B1 8/2020 Eade et al.
(Continued)

FOREIGN PATENT DOCUMENTS

WO WO-2018002910 A1 * 1/2018 ............. G01C 11/04

OTHER PUBLICATIONS

DE 102018200011 A1 with English translation; date filed Jan. 2, 2018; date published Jul. 4, 2019. (Year: 2019).*
(Continued)

*Primary Examiner* — Calvin Cheung
(74) *Attorney, Agent, or Firm* — Perkins Coie LLP

(57) ABSTRACT

Disclosed are devices, systems and methods for the operational testing on autonomous vehicles. One exemplary method includes configuring a primary vehicular model with an algorithm, calculating one or more trajectories for each of one or more secondary vehicular models that exclude the algorithm, configuring the one or more secondary vehicular models with a corresponding trajectory of the one or more trajectories, generating an updated algorithm based on running a simulation of the primary vehicular model interacting with the one or more secondary vehicular models that conform to the corresponding trajectory in the simulation, and integrating the updated algorithm into an algorithmic unit of the autonomous vehicle.

20 Claims, 10 Drawing Sheets

Related U.S. Application Data continuation of application No. 16/370,056, filed on Mar. 29, 2019, now Pat. No. 11,169,513.

(58) Field of Classification Search
CPC ........ G05B 2219/24065; G05D 1/0088; G06F 11/3664; G06F 11/3668; G01M 17/007
See application file for complete search history.

(56) References Cited

U.S. PATENT DOCUMENTS

| | | |
|---|---|---|
| 10,802,477 B1 | 10/2020 | Konrardy et al. |
| 10,997,328 B2 * | 5/2021 | Luo .................... G05B 17/02 |
| 11,130,497 B2 * | 9/2021 | Zhou ................... G06N 20/00 |
| 11,169,513 B2 | 11/2021 | Huang et al. |
| 2017/0090478 A1 | 3/2017 | Blayvas et al. |
| 2018/0113470 A1 | 4/2018 | Iagnemma et al. |
| 2018/0120843 A1 | 5/2018 | Berntorp et al. |
| 2019/0056743 A1 | 2/2019 | Alesiani et al. |
| 2019/0064825 A1 | 2/2019 | Tschanz et al. |
| 2019/0146508 A1 | 5/2019 | Dean et al. |
| 2019/0212749 A1 | 7/2019 | Chen et al. |
| 2019/0250617 A1 | 8/2019 | Ford et al. |
| 2019/0258251 A1 | 8/2019 | Ditty et al. |
| 2019/0286153 A1 | 9/2019 | Rankawat et al. |
| 2020/0310403 A1 | 10/2020 | Huang et al. |
| 2022/0050446 A1 | 2/2022 | Huang et al. |

OTHER PUBLICATIONS

Lange et al. "Wait-Free Hash Maps in the Entity-Component-System Pattern for Realtime Interactive Systems", Published in: 2016 IEEE 9th Workshop on Software Engineering and Architectures for Real time Interactive Systems (SEARIS). (Year: 2016).
US District Court for the District of Delaware, *Vehicle IP LLC* v. *AT&T Mobility LLC*, No. I :09-cv-01007, Op. at 8 (D. Del. Sep. 29, 2016).

* cited by examiner

OPERATIONAL TESTING OF AUTONOMOUS VEHICLES

CROSS-REFERENCE TO RELATED APPLICATIONS

This application is a continuation of U.S. patent application Ser. No. 17/515,366, filed on Oct. 29, 2021, which is a continuation of U.S. patent application Ser. No. 16/370,056, filed Mar. 29, 2019. The aforementioned patent applications of which are incorporated herein by reference in their entireties.

TECHNICAL FIELD

This document relates to the testing of autonomous vehicles.

BACKGROUND

Autonomous vehicle navigation is a technology for sensing the position and movement of a vehicle and, based on the sensing, autonomously controlling the vehicle to navigate towards a destination. Autonomous vehicle navigation can have important applications in transportation of people, goods and services. In order to ensure the safety of the vehicle and its passengers, as well as people and property in the vicinity of the vehicle, autonomous algorithms implemented by these applications must be robustly tested.

In most cases, it is dangerous or infeasible to robustly test autonomous algorithms in real-world driving environments. Instead, simulators can be used to test algorithms for autonomous vehicles. However, to be effective in testing autonomous vehicles, these simulators must be able to realistically model the behavior of a primary vehicle in the proximity of, and in response to, other vehicles, and must do so in a time-efficient manner.

SUMMARY

Disclosed are devices, systems and methods for the operational testing of autonomous vehicles. This may be achieved by using data collected while testing the vehicles to simulate various autonomous vehicular systems in super real-time. Simulating the autonomous vehicular systems in a variety of scenarios ensures the operational robustness of the autonomous vehicle.

In one aspect, the disclosed technology can be used to provide a method for the operational testing of an autonomous vehicle. In another aspect, the disclosed technology can be used to provide a non-transitory computer-readable program storage medium having code stored thereon, the code, when executed by a processor, causing the processor to perform a method for the operational testing of an autonomous vehicle. This method includes configuring a primary vehicular model with an algorithm, calculating one or more trajectories for each of one or more secondary vehicular models that exclude the algorithm, configuring the one or more secondary vehicular models with a corresponding trajectory of the one or more trajectories, generating an updated algorithm based on running a simulation of the primary vehicular model interacting with the one or more secondary vehicular models that conform to the corresponding trajectory in the simulation, and integrating the updated algorithm into an algorithmic unit of the autonomous vehicle.

In yet another aspect, the disclosed technology can be used to provide a device for the operational testing of an autonomous vehicle. This device includes a processor, and a memory that comprises instructions stored thereupon, wherein the instructions when executed by the processor configure the processor to configure a primary vehicular model with an algorithm, calculate one or more trajectories for each of one or more secondary vehicular models that exclude the algorithm, configure the one or more secondary vehicular models with a corresponding trajectory of the one or more trajectories, generate an updated algorithm based on running a simulation of the primary vehicular model interacting with the one or more secondary vehicular models that conform to the corresponding trajectory in the simulation, and integrate the updated algorithm into an algorithmic unit of the autonomous vehicle.

The above and other aspects and features of the disclosed technology are described in greater detail in the drawings, the description and the claims.

DETAILED DESCRIPTION

Self-driving simulations collect data to improve their autonomous vehicle algorithm training capabilities, sensor accuracy and road data quality. Industry proposals have suggested that autonomous vehicles should log 18 billion kilometers (11 billion miles) of road test data to reach an acceptable safety threshold. This would however require a fleet of 100 vehicles running on roadways 24/7 at a constant speed of 40 kilometers/hour (25 miles/hour) for 5 years. Self-driving simulations are an idealistic solution, enabling continuous and unlimited data collection in the digital environment with relatively low operational costs. In an example, the simulations can be used for replaying scenarios defined by real-world cases in real-time, wherein each scenario may last 30 seconds for motion planning purposes.

Self-driving simulations have advantages in mileage data collection efficiency, road condition dataset diversity, and sensor data accuracy, and can boost the speed of data collection to reach mileage accumulation targets while reducing fleet operation costs. Furthermore, self-driving simulations can also add more uncertainty to a dataset to increase the responsiveness of the system. They can produce a variety of scenarios to test and improve vehicle performance under different conditions, for instance in severe weather conditions, heavy traffic environments, and various distinct scenarios. Thus, for the safety and robustness of autonomous vehicle operation, millions of different scenarios may need to be considered. Embodiments of the disclosed technology provide a simulation framework that includes "super real-time" simulation capabilities wherein one second of a real-time scenario can be simulated in approximately a millisecond or less, thereby enabling the simulation of the millions of different scenarios.

Figure 1A:
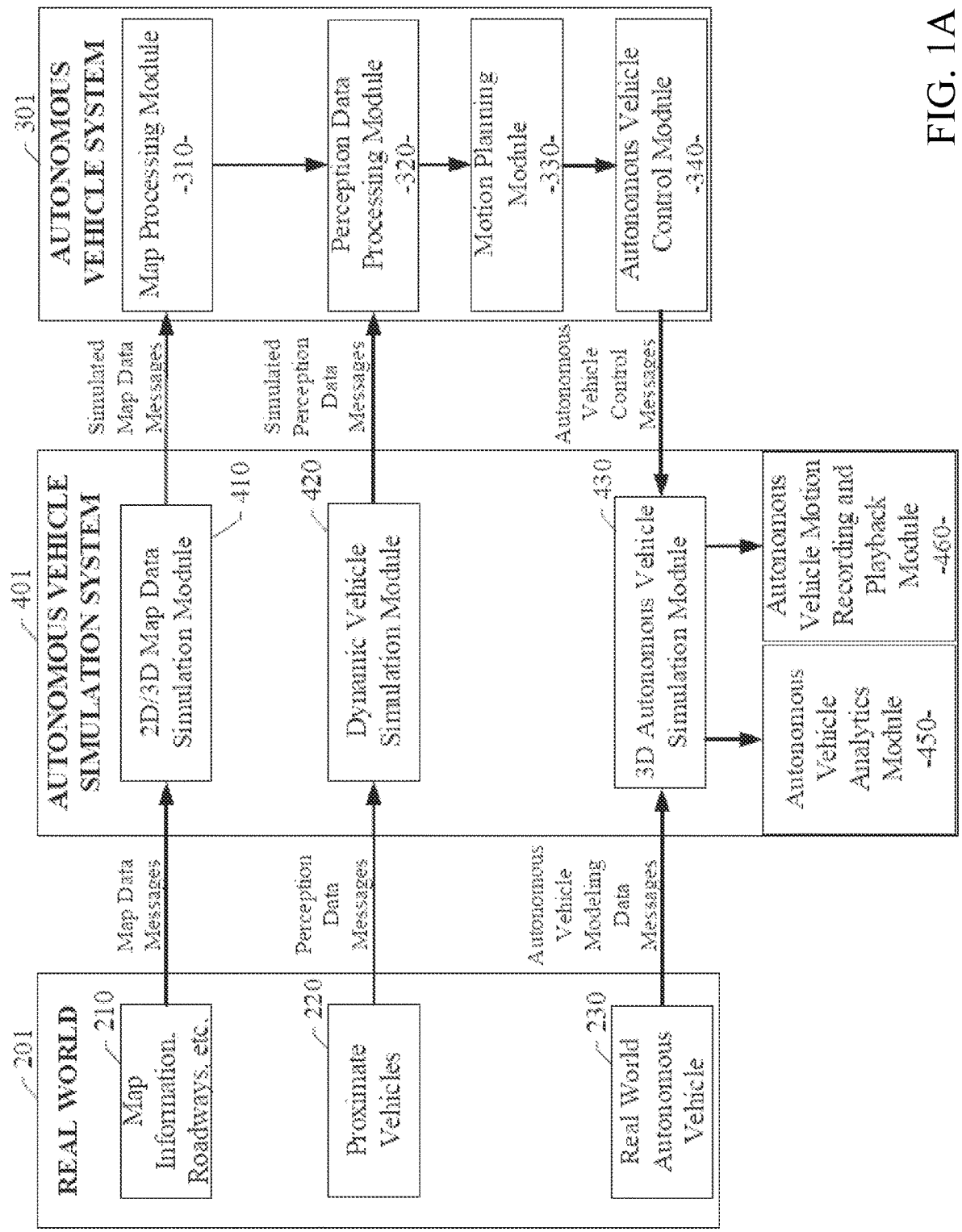
FIGS. 1A and 1B show examples of simulation frameworks for the operational testing of an autonomous vehicle, in accordance with embodiments of the disclosed technology.
Figure 1B:
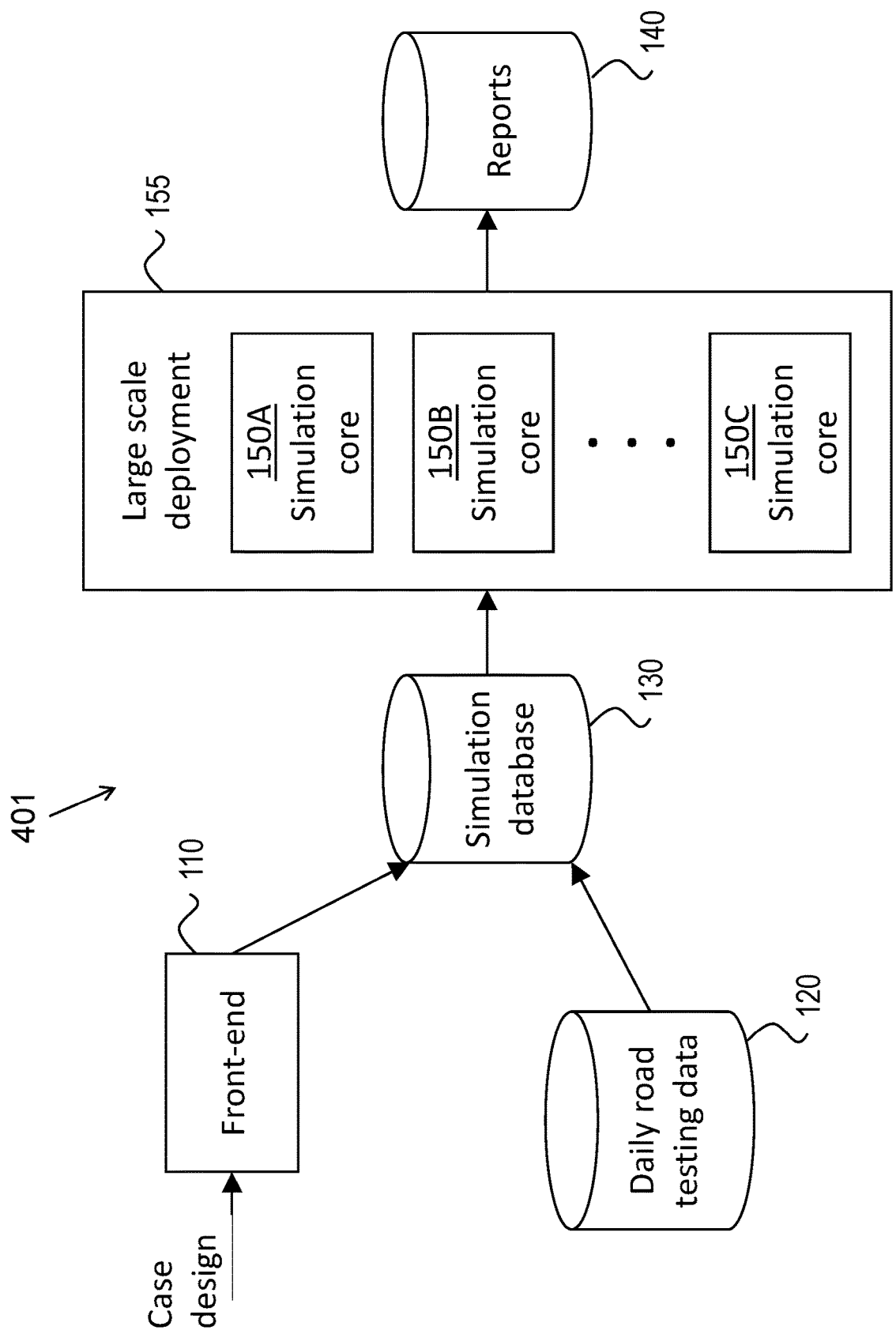

FIGS. 1A and 1B show examples of simulation frameworks for the operational testing of an autonomous vehicle, in accordance with embodiments of the disclosed technology. FIG. 1A illustrates the basic components of one exemplary embodiment of an autonomous vehicle simulation system 401 and the interaction of the autonomous vehicle simulation system 401 with the elements of the real world driving environment 201 and the autonomous vehicle system 301 for controlling an autonomous vehicle in the real world driving environment 201 according to one example embodiment. As shown in FIG. 1A, the autonomous vehicle simulation system 401 of an example embodiment can be interposed between the real world driving environment 201 and the autonomous vehicle system 301 as described above. As a result, the autonomous vehicle system 301 can receive the same types of data from the autonomous vehicle simulation system 401 as otherwise received from the real world driving environment 201. In comparison to the real world driving environment 201, the autonomous vehicle simulation system 401 can produce simulated map data messages and/or simulated perception data messages in place of the real world map information 210 and the real world perception data 215, including the real world proximate vehicle 220. The autonomous vehicle simulation system 401 can also produce simulated proximate dynamic vehicles as part of the simulated perception data messages. The simulated map data messages and/or simulated perception data messages produced by the autonomous vehicle simulation system 401 can be derived from or based on the real world map and perception data received from the real world driving environment 201.

The autonomous vehicle simulation system 401 of various example embodiments can generate two dimensional (2D) or three dimensional (3D) simulated map data to test the map processing capabilities of an autonomous vehicle system. Alternatively, the simulated map data messages and/or simulated perception data messages produced by the autonomous vehicle simulation system 401 can be completely simulated and independently generated from the real world driving environment 201. As another alternative, the real world map information 210 and the perception data 215 received from the real world driving environment 201 can be passed directly through the autonomous vehicle simulation system 401 to the autonomous vehicle system 301, making the autonomous vehicle simulation system 401 completely transparent to the real world driving environment 201 and the autonomous vehicle system 301. The autonomous vehicle simulation system 401 can thus be configured to produce simulated map data messages and simulated perception data messages that may include a configured combination of real-world data and/or simulated data, including a complete absence of real-world data or simulated data. In this manner, the autonomous vehicle simulation system 401 can be highly flexible and generally transparent to the autonomous vehicle system 301 with which it is used.

Similarly, the autonomous vehicle system 301 can output the same types of autonomous vehicle control messages to the autonomous vehicle simulation system 401 as is otherwise output to the real world autonomous vehicle 230 in the real world driving environment 201. These autonomous vehicle control messages generated by the autonomous vehicle system 301 can be received by the autonomous vehicle simulation system 401 and analyzed to determine the validity and appropriateness of the control messages under the circumstances presented by the simulated map data and the simulated perception data. The autonomous vehicle simulation system 401 can generate metrics or analytics data corresponding to the analysis of the autonomous vehicle control messages generated by the autonomous vehicle system 301 and/or the motion planning module 330 therein.

The autonomous vehicle simulation system 401 can also generate vehicle motion recording data corresponding to the autonomous vehicle control messages generated by the autonomous vehicle system 301. The vehicle motion recording data can capture the motion and behavior of a simulated autonomous vehicle as controlled using the autonomous vehicle control messages generated by the autonomous vehicle system 301. The vehicle motion recording data can include data corresponding to the map data and perception data synchronized with the associated autonomous vehicle control messages. As a result, the vehicle motion recording data can record a time-sequenced set of map data, perception data, and corresponding vehicle control messages produced by the autonomous vehicle system 301 and/or the motion planning module 330. Thus, the autonomous vehicle system 301 can be stimulated by the autonomous vehicle simulation system 401 with specifically configured inputs and the resulting output produced by the autonomous vehicle system 301 can be analyzed, recorded, and validated.

Moreover, the vehicle motion recording data can be retained and played back to conduct further analysis of the operation of the autonomous vehicle system 301 and the motion planning module 330 therein. The autonomous vehicle simulation system 401 can enable the playback of the recorded vehicle motion data to highlight or isolate the analysis of the performance of the autonomous vehicle control module 340 and motion planning module 330 in various driving and traffic scenarios. The autonomous vehicle simulation system 401 can further allow the modification of the motion planning module 330 and a restart of the simulation at any point in a test scenario using the recorded vehicle motion data. Additionally, the autonomous vehicle simulation system 401 can read a record created from physical experiments and use the record to generate simulated perception data that is the same or equivalent to the physical experiment record. Therefore, the autonomous vehicle simulation system 401 of the example embodiments disclosed herein provides a versatile simulation system for testing an autonomous vehicle control system or motion planner.

The autonomous vehicle simulation system 401 can directly simulate real-world objects to provide a highly realistic environment for an autonomous vehicle system. In some embodiments, the autonomous vehicle simulation system 401 can be used for individual subsystem testing (e.g., map, motion planning, control, etc.), or for a more robust integration test that includes all autonomous vehicle subsystems. In other embodiments, the autonomous vehicle simulation system 401 can be used for autonomous vehicle control system development and parameters tuning.

FIG. 1B illustrates the basic components of another exemplary embodiment of an autonomous vehicle simulation system. As shown in FIG. 1B, the autonomous vehicle simulation system 401 includes a front-end 110 that is used to design different scenarios, and which may include a user-interface that enables the case design (or scenario) to be input. The front-end 110 is coupled to a simulation database 130, which also receives input from daily road testing data 120. In an example, the daily road testing data 120 may be stored in a different database or imported directly from the on-board storage of one or more autonomous vehicles. In some embodiments, the simulation database 130 stores the scenarios in different categories based on one or more scenario parameters. For example, the scenarios may be categorized by the speed of the primary (or focus, or host) vehicle, the average speed of one or more proximate vehicles, the trajectory of the primary vehicle, etc.

The autonomous vehicle simulation system 401 further includes a large-scale deployment 155 of simulation cores (150A, 150B, . . . , 150C), which can be configured to simulate the operation of various algorithmic modules, e.g., HDMap, control, prediction, motion planning, etc. In some embodiments, the output of the simulations may be stored in a reports database 140 for further analysis or data aggregation.

In some embodiments, the simulation frameworks shown in FIGS. 1A and 1B can be advantageously used to test corner (or edge) cases, which involve a problem or situation that occurs only outside of normal operating parameters—specifically one that manifests itself when multiple environmental variables or conditions are simultaneously at extreme levels, even though each parameter is within the specified range for that parameter. Typically, it would be dangerous to attempt to reproduce some corner cases in the real-world, and thus the simulation environment increases the robustness of autonomous vehicle algorithms by testing the algorithms under extreme levels of multiple parameters.

In some embodiments, each of the simulation cores (150A, 150B, . . . , 150C) uses an entity-component system (ECS) architecture to design the program and/or scenarios. An ECS architecture follows the composition over inheritance principle that allows greater flexibility in defining entities where every object in a scenario is an entity. In an example, every entity consists of one or more components which add behavior or functionality. An example of the ECS architecture applied to autonomous vehicle simulations, and implemented in a simulation core, is shown in FIG. 2.

Figure 2:
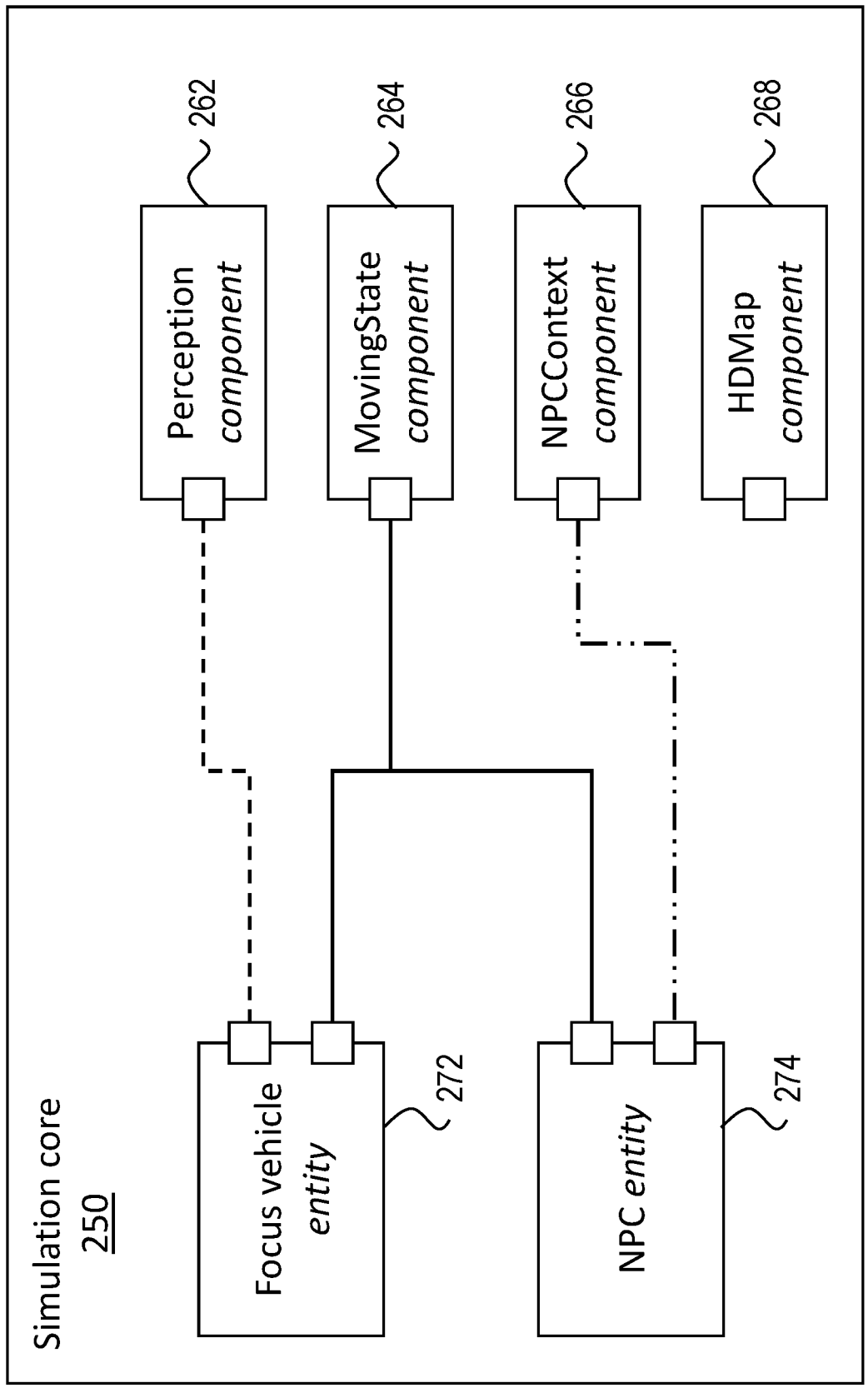
FIG. 2 shows an example of the entity-component-system (ECS) framework used in the simulation core for the operational testing of the autonomous vehicle.

In some embodiments, and as shown in FIG. 2, the simulation core 250 comprises a focus (or host, or primary) vehicle entity 272 and a non-player character (NPC) entity 274. More generally, each vehicle is represented as an entity, and may have different components as shown in FIG. 2. In an example, the focus vehicle entity 272 may include a perception component 262, which is used to record perception information for the planning module of the focus vehicle entity 272, and a MovingState component 264, which records the current state of the focus vehicle entity 272. The NPC entity may include an NPCContext component 266, which is used by the NPC system to update where the NPC should move to at the next timestep, and the MovingState component 264. The simulation core may also include one or more singleton components, e.g., the HDMap component 268, which do not belong to any of the entities.

The ECS architecture provides a great deal of flexibility in the design and execution of the simulation since other components may be added to existing entities, or new entities may be added and configured to include existing components, without overhauling the existing codebase. In some embodiments, the simulation core 250 updates on a frame-by-frame basis to ensure that the refined and tested algorithms may be transferred back to the autonomous vehicle for operation in the real-world (e.g., messages from the autonomous vehicle simulation system 401 to the autonomous vehicle system 301 in FIG. 1).

Embodiments of the disclosed technology, as shown in the examples in FIGS. 1A and 1B, provide simulation frameworks (which include the simulation core shown in FIG. 2) that are capable of running in super real-time, e.g., one second of real-world autonomous vehicle operation is simulated (on a frame-by-frame basis) in a millisecond or less of simulation time. In some embodiments, this is achieved by using one or more of pre-calculated trajectories for the NPC entities, turning off sub-systems that are not crucial to the scenario under consideration, using simple rule-based planning for the NPC entities, etc.

Figure 3:
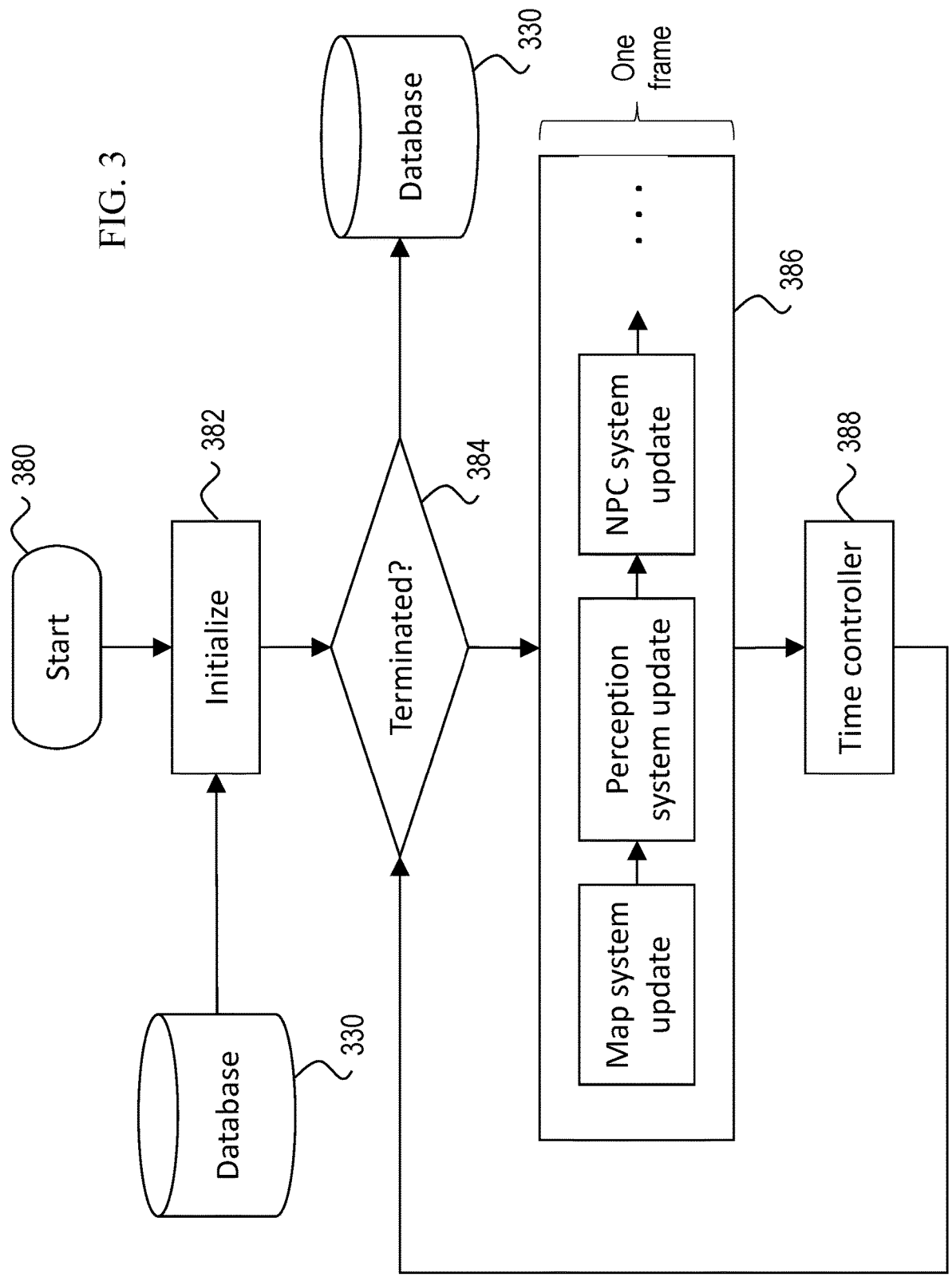
FIG. 3 shows an example of the multi-threaded framework of the simulation used in the operational testing of the autonomous vehicle.

FIG. 3 shows an example of the multi-threaded framework of the simulation used in the operational testing of the autonomous vehicle. As shown therein, an exemplary method of using the multi-threaded framework starts 380 with the initialization 382 of the scenario and the underlying ECS framework using, for example, a database 330 that stores the different scenarios in a categorized manner. In some embodiments, the scenarios are stored with algorithms (and associated parameters) for the primary (or host, or focus) vehicle and pre-calculated trajectories for the one or more NPC entities in the scenario. It is first determined 384 whether there are any available frames to process in the current scenario; if there are not, the simulation completes with a simulation report being stored on another (output) database 330, whereas if there are, then a single frame is processed 386. In some embodiments, processing a single frame includes a map system update, a perception system update, an NPC system update, etc. In other words, various algorithms of the primary vehicle are updated for the current frame and the location of each NPC entity on its respective trajectory is advanced one frame.

In an example, using a multi-threaded approach enables the processing of a single frame in 0.03 milliseconds, and thus a time controller 388 is used to control the simulation speed via a call to, for example, a "system sleep" function. This advantageously ensures that a time-synchronized frame-by-frame simulation can be run for all active (and pertinent) subsystems in the autonomous vehicle model as it interacts with the one or more NPC entities that are moving on their pre-calculated trajectories. In some embodiments, serialized data structures and an interface description language (e.g., protobuf or Protocol Buffers) are used in the simulation core for message passing and recording.

In the example considered earlier, 5 years of roadway testing by a fleet of 100 vehicles corresponds to approximately $1.55 \times 10^8$ seconds of real-world operation per vehicle. If it is assumed that the simulations operate at a frame rate of 15 frames/sec, and based on the multi-threaded approach requiring 0.03 ms per frame, it would take roughly 1900 hours of simulation time in order to replicate the industry suggested road testing to reach an acceptable safety threshold. Thus, if 200 virtual servers could be harnessed (e.g., EC2 instances on Amazon Web Services), the complete set of simulations could be run in approximately 10 hours. Thus, embodiments of the disclosed technology provide a significant speed-up with regard to ensuring the operational robustness of autonomous vehicles.

In some embodiments, the simulation core (e.g., simulation core 250 in FIG. 2) can use one or more of several methods to generate (or pre-calculate) the trajectories of the NPC entities. The state of the host (of focus) vehicle and the states of the NPC vehicles can include the current position/location and heading of each vehicle and the related derivatives including velocity and acceleration of each vehicle (e.g., which may be tracked by the MovingState component 264). Additionally, an external speed profile of the host vehicle can be generated on-the-fly or off-line and retained to model the speed profile or performance characteristics of a particular vehicle when executing a lane change maneuver.

In one example, the simulation core can obtain the vehicle state information, the host vehicle speed profile information and a target position, and can then generate or fit a Dubins curve as the trajectory of the host vehicle from its current position to the target position in an adjacent lane. A Dubins curve or path typically refers to the shortest curve that connects two points in the two-dimensional Euclidean plane (e.g., the x-y plane) with a constraint on the curvature of the path and with prescribed initial and terminal tangents to the path, and an assumption that the vehicle traveling the path can only travel forward. Initially, the simulation core can obtain or determine an initial set of Dubins parameters (a, t0, t1), where a represents a constraint on the curvature of the path or the minimum turning radius of the host vehicle, t0 specifies the starting time when the Dubins curve starts, and t1 specifies the time when the Dubins curve ends. The initial set of Dubins parameters can be determined from the vehicle state information, the host vehicle speed profile information, and the target position. The set of Dubin's parameters provides a level of flexibility for the trajectory generation to avoid collisions and to accommodate various types of vehicles with different profiles.

In another example, the simulation core can obtain the vehicle state information, the host vehicle speed profile information and the target position, and can generate the NPC entity trajectory based on spline-fitting. A spline refers to a piecewise polynomial parametric curve. Splines can be used to approximate a curved trajectory from the host vehicle's current position to the target position.

In yet another example, the simulation core can fit a piecewise linear speed trajectory function, which can be configured to satisfy the constraints of the initial host vehicle state, the initial states of the NPC vehicles, the goal state of the host vehicle and optional optimizations on various cost functions (e.g., time, fuel consumption, etc.).

Figure 4A:
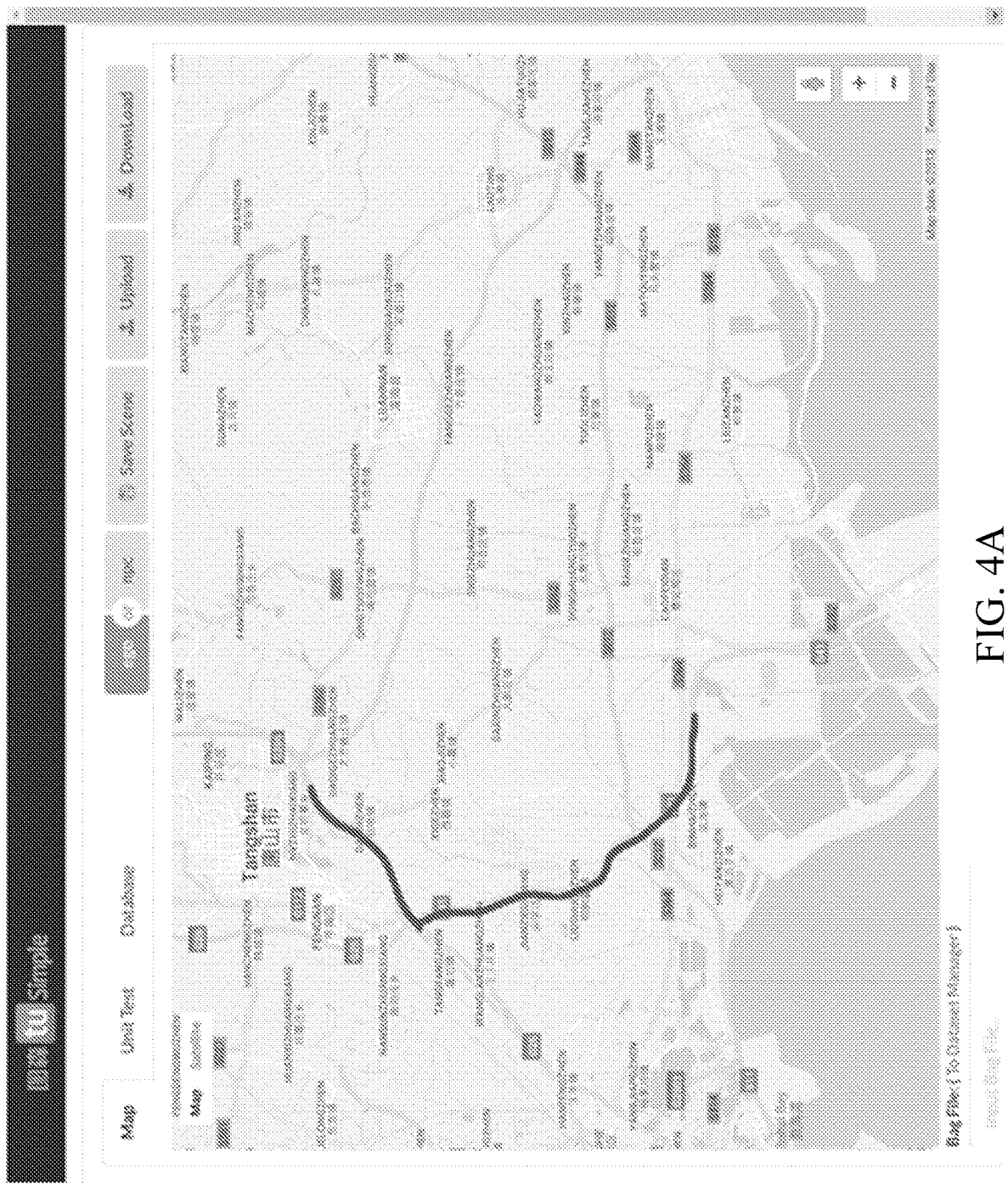
FIGS. 4A-4D show exemplary screenshots for the process of setting up and simulating an operational test of an autonomous vehicle.

FIGS. 4A-4D show example screenshots for the process of setting up and simulating an operational test of an autonomous vehicle (e.g., using front-end 110 in FIG. 1). The process begins as shown in FIG. 4A with an overview of the geographical area of interest, and selecting a path for the autonomous vehicle simulation. In some embodiments, and as shown in FIG. 4A, the origin and destination of a scenario may be chosen in different cities to ensure that the scenario provides coverage of both in-city (e.g., local streets) and inter-city (e.g., freeways, highways) routes. In other embodiments, a route within a city may be selected to cover the "last mile" scenario that is ubiquitous in transportation and shipping scenarios.

Figure 4B:
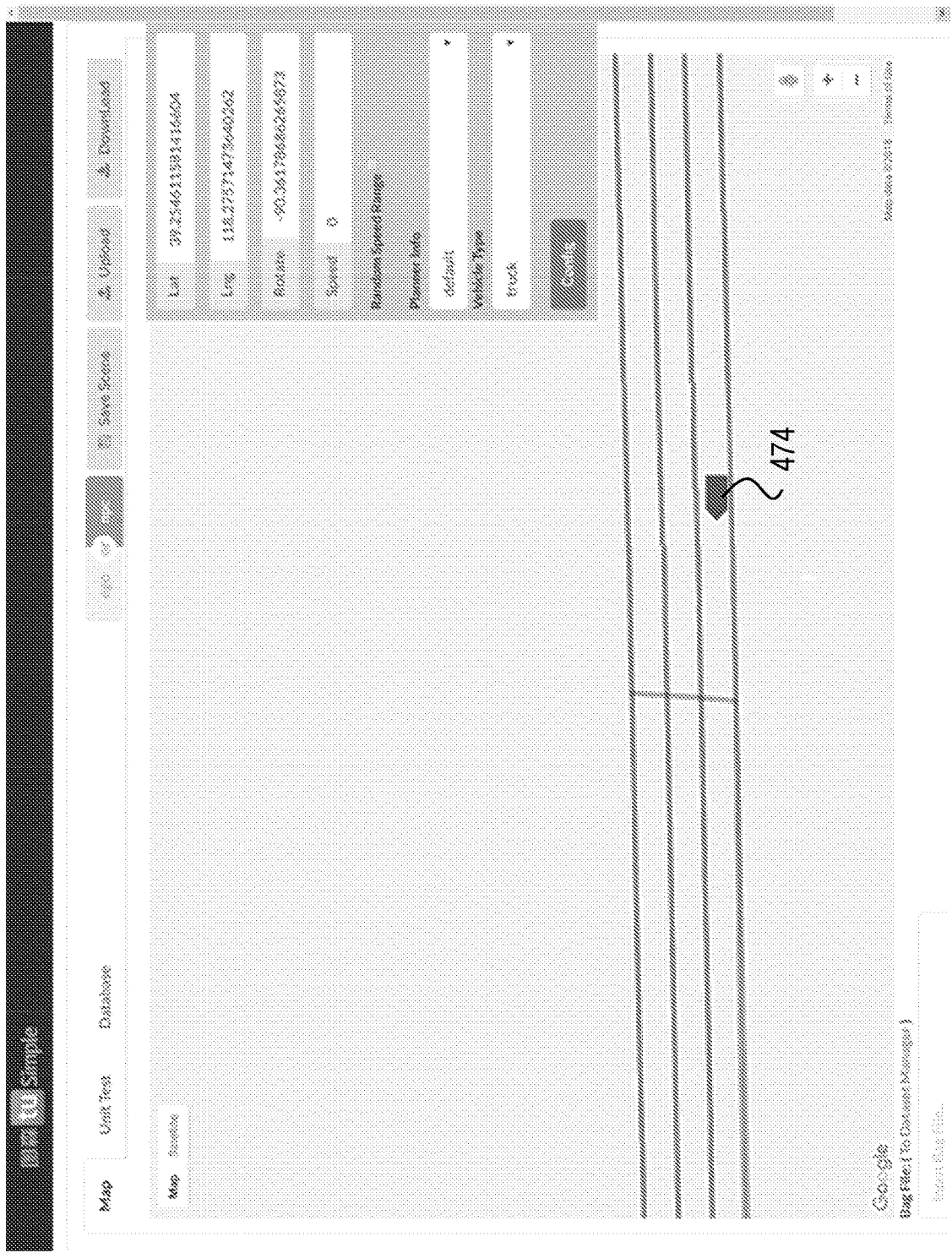
Figure 4C:
Figure 4D:
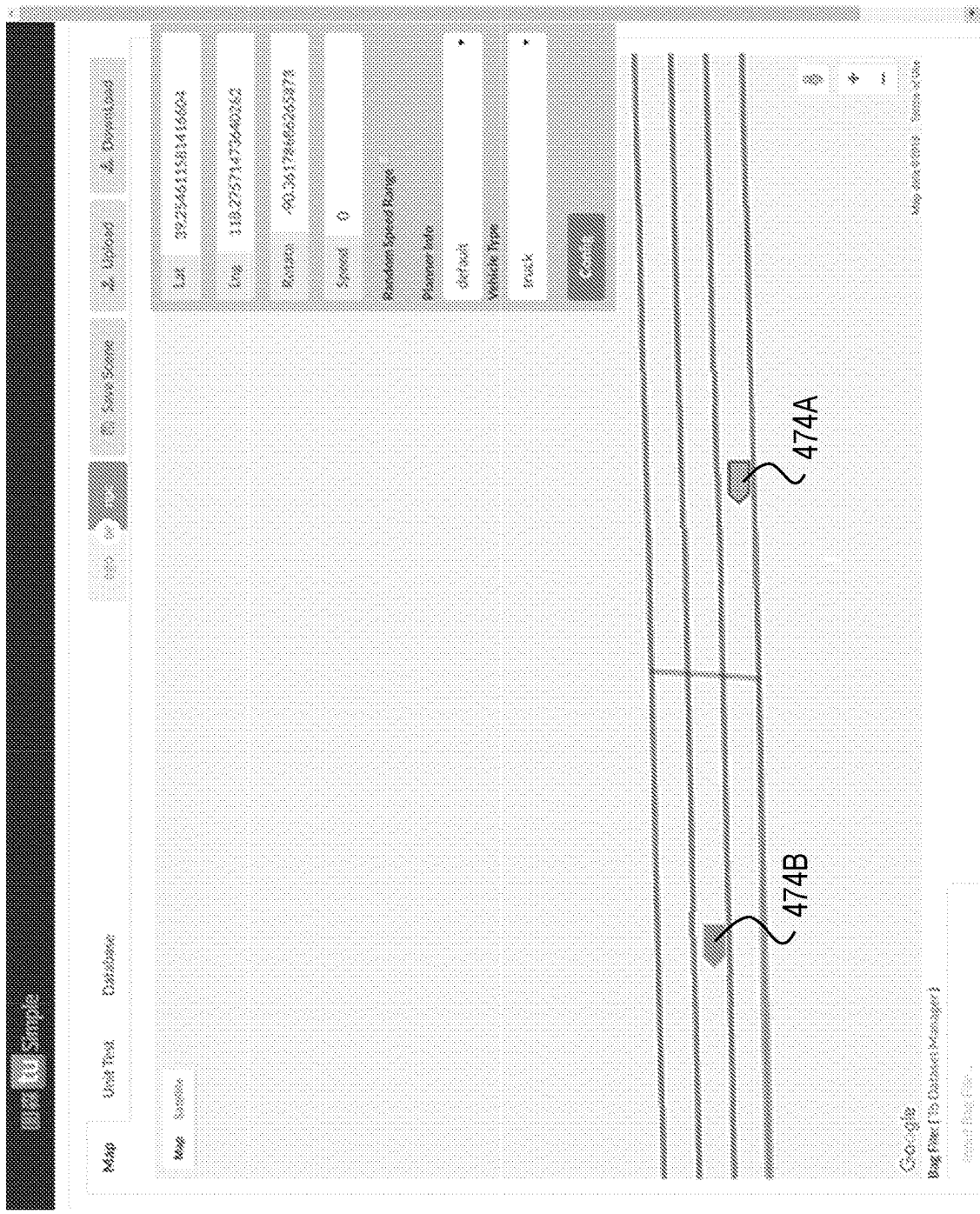

In the next step, and as shown in FIG. 4B, an NPC vehicle 474 may be placed in a desired (initial) position, e.g., in a specific lane and at a particular spot on the route between the origin and the destination. FIG. 4C illustrates the next step wherein the trajectory of the NPC vehicle 474 is configured. In an example, an initial acceleration and/or speed of the vehicle, how close it starts from the primary vehicle, whether it should change lanes are parameters and its target (or final) position can be configured for each NPC entity. In some embodiments, a fixed value could be provided for each parameter. In other embodiments, a range of values may be selected and a value may be randomly selected from that range. The process of setting up and simulating an operational test of an autonomous vehicle concludes, as shown in FIG. 4D, with saving the configuration into a database. As shown in FIG. 4D, the user-interface of the front-end displays the initial position 474A and the final position 474B of the NPC vehicle. Once the configured NPC entity has been saved into the database, a trajectory for the NPC entity may be generated between the initial and final positions and using the configured parameters, and this pre-calculated trajectory may be used in the simulation for that scenario.

In some embodiments, the NPC entities remain on the pre-calculated trajectories and do not interact with the primary vehicle. For example, if an NPC vehicle was behind the primary vehicle and was to get too close to it, it would not slow down since its pre-calculated trajectory does not include reducing its speed. In this scenario, the primary vehicle may recognize that the NPC vehicle was right behind it, and may either change lanes or speed up to ensure that the NPC vehicle maintains a safe following distance.

In other embodiments, the NPC entities may be configured with varying degrees of autonomy. For example, the autonomy may be include an artificial intelligence (AI)-based motion planning module with (or without) reinforcement learning or a simple planning module that implements rule-based motion planning that is simpler than the algorithms of the primary vehicle. In this configuration, the NPC entities may react (in a limited manner) to the trajectory of the primary vehicle, which would then respond to the NPC vehicle reactions.

Using pre-calculated trajectories for the NPC entities, either with or without motion planning modules that can react to the primary vehicle, advantageously enables the simulation to run in super real-time, yet maintain the accuracy and fidelity of the results of the autonomous vehicle algorithms being tested in that particular scenario due to the time-synchronized frame-by-frame implementation that is based on the ECS architecture (e.g., FIG. 2) and the multi-threaded framework (e.g., FIG. 3).

Figure 5:
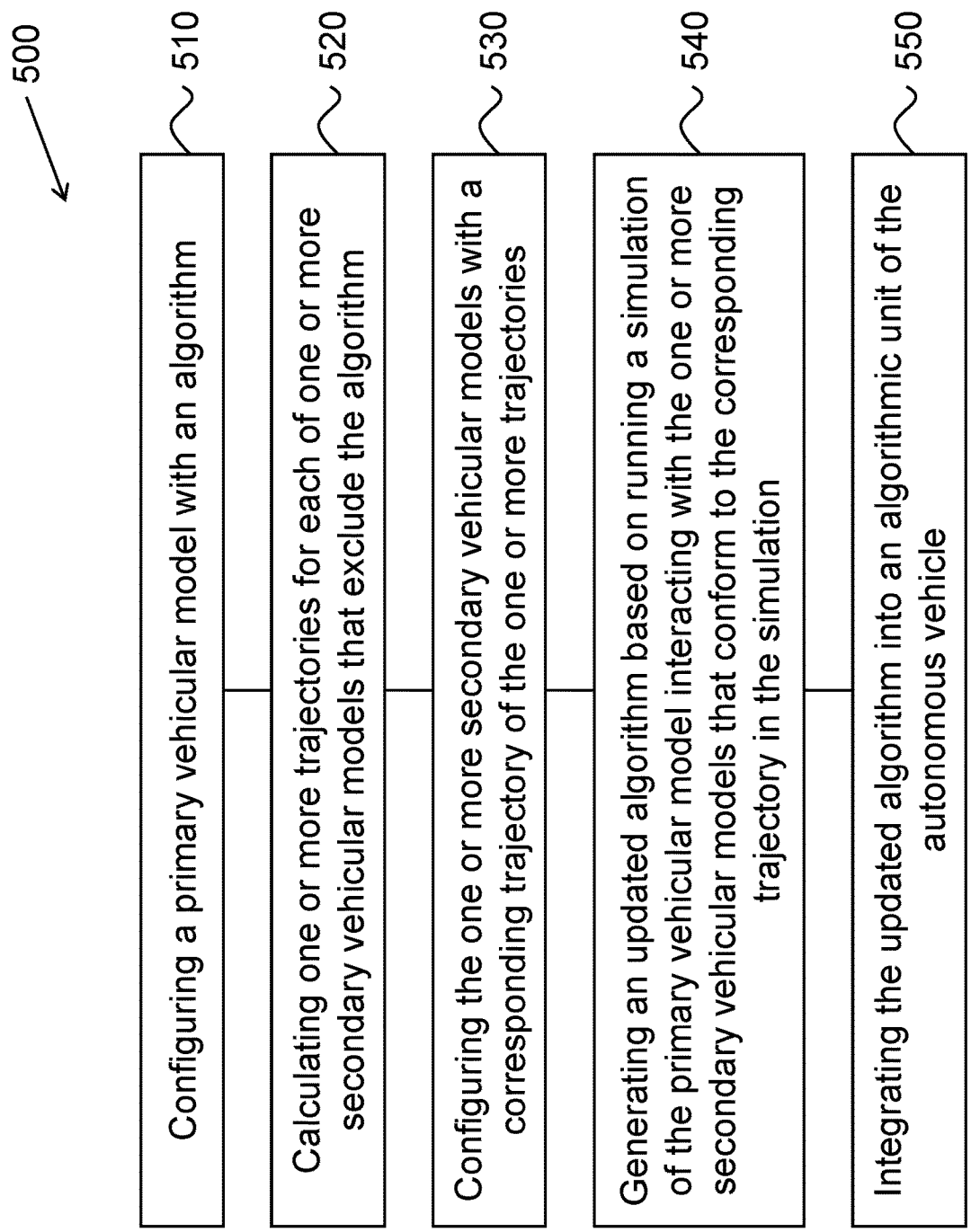
FIG. 5 is a flowchart of an exemplary method for the operational testing of an autonomous vehicle, in accordance with embodiments of the disclosed technology.

FIG. 5 is a flowchart of an exemplary method for the operational testing of an autonomous vehicle. The method 500 includes, at the step 510, configuring a primary vehicular (also referred to as the "focus vehicle" or "host vehicle") model with an algorithm. In some embodiments, the primary vehicle can be configured with one or more algorithms shown in FIG. 1A, e.g., algorithms from the map processing module 310, perception data processing module 320, motion planning module 330 or the autonomous vehicle control module 340. In some embodiments, and in the context of FIG. 1A, the 3D autonomous vehicle simulation module 430 can configure the primary vehicle with one or more of these algorithms.

The method 500 includes, at the step 520, calculating one or more trajectories for each of one or more secondary (also referred to as a non-player character (NPC)) vehicular models that exclude the algorithm. In some embodiments, and as described in the context of FIG. 4, the NPC vehicular model may be configured with varying degrees of autonomy. In an example, the NPC model maintains the pre-calculated trajectory and does not interact with the primary vehicle model. In another example, the NPC model follows the pre-calculated trajectory but can deviate by a predetermined amount in order to ensure safer driving conditions.

The method 500 includes, at the step 530, configuring the one or more secondary vehicular models with a corresponding trajectory of the one or more trajectories. In some embodiments, the one or more secondary vehicular models may be further configured to ensure that there are no deviations from the assigned trajectories and that they do not interact with the primary vehicle. In other embodiments, the one or more secondary vehicular models may be further configured to interact with the primary vehicle, thereby deviating from the pre-calculated trajectories but only by a pre-determined amount.

The method 500 includes, at the step 540, generating an updated algorithm based on running a simulation of the primary vehicular model interacting with the one or more secondary vehicular models that conform to the corresponding trajectory in the simulation. In some embodiments, the updated algorithm is based on the interactions between the primary vehicular model and the one or more secondary models, without the latter reacting to the former. In other embodiments, the updated algorithm is based on the primary vehicular model (that includes a first set of algorithms) interacting with the one or more secondary vehicular models (each of which include a second set of algorithms that are less complex than the first set of algorithms).

In some embodiments, the simulation is based on an entity-component-system (ECS) architecture. In an example, the primary vehicular model comprises a perception component that is configured to interact with the one or more secondary vehicular models, the secondary vehicular models comprise a context component that is configured to advance along the corresponding trajectory, and the primary vehicular model and the one or more secondary vehicular models comprise a moving state component that is configured to record a current state of the respective vehicular model.

In some embodiments, the simulation includes a multi-threading function that is configured to independently simulate the primary vehicular model and the one or more secondary vehicular models. In other embodiments, the simulation further comprises at least one protocol buffer that is configured to pass and record messages between the primary vehicular model and the one or more secondary vehicular models.

The method 500 includes, at the step 550, integrating the updated algorithm into an algorithmic unit of the autonomous vehicle.

In some embodiments, at least one of the one or more secondary vehicular models do not react to a trajectory of the primary vehicular model. In an example, the trajectory of the primary vehicular model and the one or more trajectories are based on Dubins paths. In another example, the trajectory of the primary vehicular model and the one or more trajectories are based on a spline fitting process. In yet another example, the trajectory of the primary vehicular model and the one or more trajectories are based on a piecewise linear speed trajectory function. In yet another example, each of the one or more trajectories is based on at least one of a plurality of waypoints, a speed or a heading.

In some embodiments, at least one of the one or more secondary vehicular models comprises an artificial intelligence module and reacts to a trajectory of the primary vehicular model.

Embodiments of the disclosed technology include a device for operational testing of an autonomous vehicle that includes a processor and a memory that comprises instructions stored thereupon, wherein the instructions when executed by the processor configure the processor to configure a primary vehicular model with an algorithm, calculate one or more trajectories for each of one or more secondary vehicular models that exclude the algorithm, configure the one or more secondary vehicular models with a corresponding trajectory of the one or more trajectories, generate an updated algorithm based on running a simulation of the primary vehicular model interacting with the one or more secondary vehicular models that conform to the corresponding trajectory in the simulation, and integrate the updated algorithm into an algorithmic unit of the autonomous vehicle.

In some embodiments, the simulation is based on an entity-component-system (ECS) architecture. In an example, the primary vehicular model comprises a perception component that is configured to interact with the one or more secondary vehicular models, the secondary vehicular models comprise a context component that is configured to advance along the corresponding trajectory, and the primary vehicular model and the one or more secondary vehicular models comprise a moving state component that is configured to record a current state of the respective vehicular model.

In some embodiments, the simulation comprises a multi-threading function that is configured to independently simulate the primary vehicular model and the one or more secondary vehicular models, and the simulation further comprises at least one protocol buffer that is configured to pass and record messages between the primary vehicular model and the one or more secondary vehicular models.

In some embodiments, at least one of the one or more secondary vehicular models do not react to a trajectory of the primary vehicular model. In an example, the trajectory of the primary vehicular model and the one or more trajectories are based on Dubins paths.

In some embodiments, at least one of the one or more secondary vehicular models comprises an artificial intelligence module and reacts to a trajectory of the primary vehicular model.

In some embodiments, each of the one or more trajectories is based on at least one of a plurality of waypoints, a speed or a heading.

Embodiments of the disclosed technology include a non-transitory computer-readable program storage medium having code stored thereon, the code, when executed by a processor, causing the processor to perform operational testing of an autonomous vehicle, the method comprising configuring a primary vehicular model with an algorithm, calculating one or more trajectories for each of one or more secondary vehicular models that exclude the algorithm, configuring the one or more secondary vehicular models with a corresponding trajectory of the one or more trajectories, generating an updated algorithm based on running a simulation of the primary vehicular model interacting with the one or more secondary vehicular models that conform to the corresponding trajectory in the simulation, and integrating the updated algorithm into an algorithmic unit of the autonomous vehicle.

In some embodiments, the simulation is based on an entity-component-system (ECS) architecture. In an example, the primary vehicular model comprises a perception component that is configured to interact with the one or more secondary vehicular models, the secondary vehicular models comprise a context component that is configured to advance along the corresponding trajectory, and the primary vehicular model and the one or more secondary vehicular models comprise a moving state component that is configured to record a current state of the respective vehicular model.

In some embodiments, the simulation comprises a multi-threading function that is configured to independently simulate the primary vehicular model and the one or more secondary vehicular models, and wherein the simulation further comprises at least one protocol buffer that is configured to pass and record messages between the primary vehicular model and the one or more secondary vehicular models.

Figure 6:
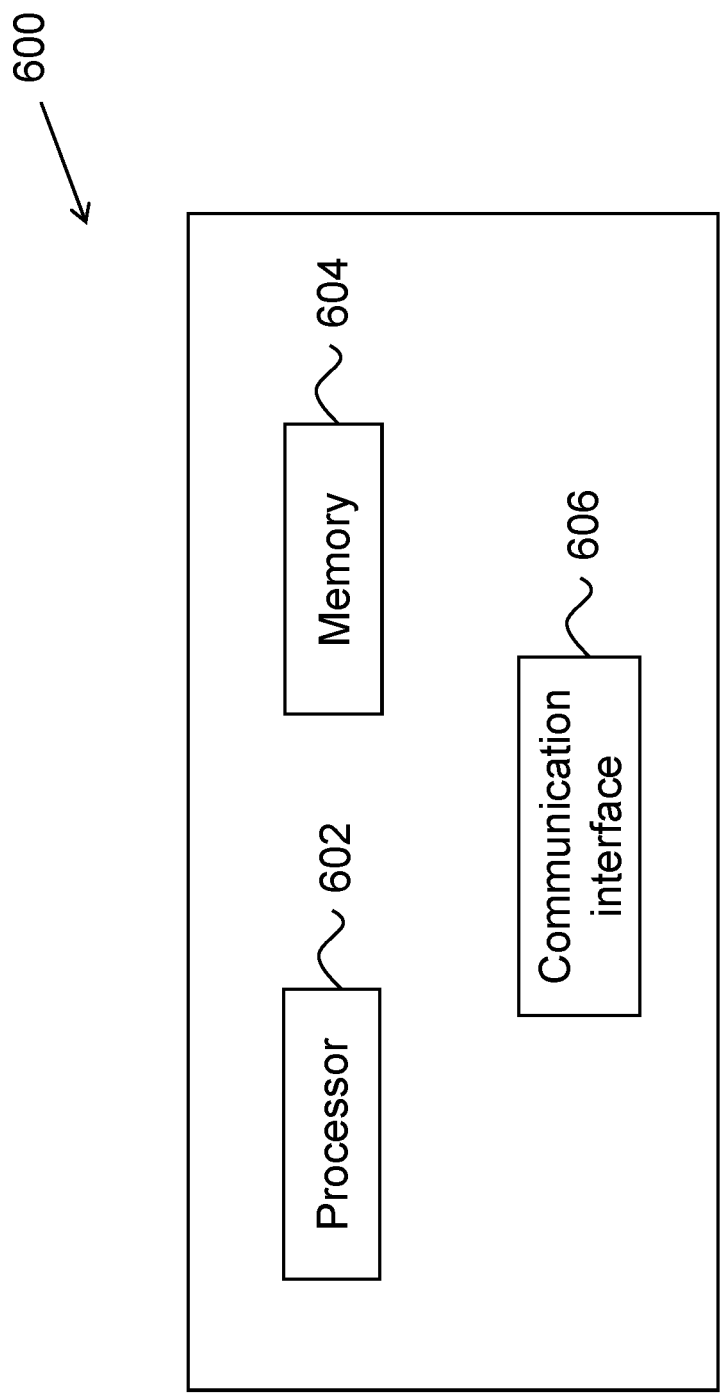
FIG. 6 shows an example of a hardware platform that can implement some techniques described in the present document.

FIG. 6 shows an example of a hardware platform 600 that can be used to implement some of the techniques described in the present document. For example, the hardware platform 600 may implement the method 500 or may implement the various modules described herein. The hardware platform 600 may include a processor 602 that can execute code to implement a method. The hardware platform 600 may include a memory 604 that may be used to store processor-executable code and/or store data. The hardware platform 600 may further include a communication interface 606. For example, the communication interface 606 may implement one or more of the communication protocols (LTE, Wi-Fi, and so on) described herein.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for operational testing of an autonomous vehicle by computer simulation, comprising:
configuring a primary vehicular model that represents the autonomous vehicle;
simulating a driving environment including one or more secondary vehicular models;
generating motion recording data and control messages of the primary vehicular model by running a time-synchronized frame-by-frame simulation of the primary vehicular model interacting with the one or more secondary vehicular models in the simulated driving environment; and
performing the operational testing of the autonomous vehicle by assessing at least one of the motion recording data or the control messages, wherein the one or more secondary vehicular models comprise multiple secondary vehicular models of varying degrees of autonomy.

2. The method of claim 1, further comprising:
determining a trajectory for each of the one or more secondary vehicular models, wherein the time-synchronized frame-by-frame simulation of the primary vehicular model interacting with the one or more secondary vehicular models comprises simulating movement of the one or more secondary vehicular models along the respective one or more trajectories.

3. The method of claim 2, wherein at least one trajectory, or a portion thereof, of the one or more trajectories of the one or more secondary vehicular models conforms to a Dubins path or a spline.

4. The method of claim 2, wherein each of the one or more trajectories is represented based on at least one of a plurality of waypoints, a speed, or a heading.

5. The method of claim 1, wherein at least one of the one or more secondary vehicular models is configured to react to the primary vehicular model.

6. The method of claim 1, wherein at least one of the one or more secondary vehicular models comprises an artificial intelligence module.

7. The method of claim 1, wherein the simulating the driving environment comprises:
generating the driving environment based on at least one of a weather condition, a traffic condition, real world map information, simulated map information, real world perception data, or simulated perception data.

8. The method of claim 1, wherein:
the motion recording data of the primary vehicular model comprises a trajectory that fits a Dubins path, and
the running the time-synchronized frame-by-frame simulation of the primary vehicular model interacting with the one or more secondary vehicular models in the simulated driving environment comprises determining a set of parameters of the Dubins path so as to avoid collision between the primary vehicular model with any one of the one or more secondary vehicular models.

9. The method of claim 1, wherein the motion recording data comprises map data and perception data relating to the primary vehicular model, the method further comprising:
storing the map data, the perception data, and the control messages as a synchronized time-sequenced set.

10. The method of claim 1, wherein the computer simulation is based on an entity-component-system (ECS) architecture.

11. The method of claim 1, wherein the primary vehicular model and the one or more secondary vehicular models each comprise a moving state component that is configured to record a current state of a respective vehicular model.

12. The method of claim 1, wherein the computer simulation further comprises at least one protocol buffer that is configured to pass and record messages between the primary vehicular model and the one or more secondary vehicular models.

13. The method of claim 1, wherein at least one of the one or more secondary vehicular models do not react to a trajectory of the primary vehicular model.

14. A system for operational testing of an autonomous vehicle by computer simulation, comprising:
one or more processors; and
memory that comprises instructions stored thereupon, wherein the instructions when executed by the one or more processors, cause operations comprising:
configuring a primary vehicular model that represents the autonomous vehicle;
simulating a driving environment including one or more secondary vehicular models;
generating motion recording data and synchronized control messages of the primary vehicular model by running a time-synchronized frame-by-frame simulation of the primary vehicular model interacting with the one or more secondary vehicular models in the simulated driving environment; and
performing the operational testing of the autonomous vehicle by assessing at least one of the motion recording data or the control messages, wherein the one or more secondary vehicular models comprise multiple secondary vehicular models of varying degrees of autonomy.

15. The system of claim 14, wherein the one or more secondary vehicular models are configured with varying degrees of autonomy.

16. The system of claim 14, wherein the computer simulation comprises a multi-threading function that is configured to independently simulate the primary vehicular model and the one or more secondary vehicular models.

17. The system of claim 14, wherein a processing time for the system to simulate a real-time scenario of one second relating to the autonomous vehicle is no more than a millisecond.

18. The system of claim 14, further comprising a time controller configured to control a simulation speed of the time-synchronized frame-by-frame simulation.

19. The system of claim 14, the operations further comprising: testing a map processing capacity of the autonomous vehicle by generating simulated map data.

20. One or more non-transitory computer-readable program storage media having code stored thereon, the code, when executed by one or more processors, causing the one or more processors to perform a method for operational testing of an autonomous vehicle by computer simulation, the method comprising:
configuring a primary vehicular model that represents the autonomous vehicle;
simulating a driving environment including one or more secondary vehicular models;
generating motion recording data and control messages of the primary vehicular model by running a time-synchronized frame-by-frame simulation of the primary vehicular model interacting with the one or more secondary vehicular models in the simulated driving environment; and
performing the operational testing of the autonomous vehicle by assessing at least one of the motion recording data or the control messages, wherein the one or more secondary vehicular models comprise multiple secondary vehicular models of varying degrees of autonomy.

* * * * *